US011589551B2

(12) United States Patent
Bishop

(10) Patent No.: US 11,589,551 B2
(45) Date of Patent: Feb. 28, 2023

(54) PET STROLLER WITH MOTOR OPERATED TREADMILL

(71) Applicant: John Bishop, Santa Ana, CA (US)

(72) Inventor: John Bishop, Santa Ana, CA (US)

(*) Notice: Subject to any disclaimer, the term of this patent is extended or adjusted under 35 U.S.C. 154(b) by 0 days.

(21) Appl. No.: 17/396,082

(22) Filed: Aug. 6, 2021

(65) Prior Publication Data

US 2022/0039347 A1 Feb. 10, 2022

Related U.S. Application Data

(60) Provisional application No. 63/062,587, filed on Aug. 7, 2020.

(51) Int. Cl.
*A01K 1/02* (2006.01)
*A01K 15/02* (2006.01)

(52) U.S. Cl.
CPC .......... *A01K 1/0245* (2013.01); *A01K 15/027* (2013.01)

(58) Field of Classification Search
CPC ............... A01K 1/0245; A01K 1/0236; A01K 15/027
USPC ........................................................ 119/700
See application file for complete search history.

(56) References Cited

U.S. PATENT DOCUMENTS

| | | | | | |
|---|---|---|---|---|---|
| 2,506,322 A | * | 5/1950 | Yushak | ................ | A01K 15/027 119/700 |
| 3,485,213 A | * | 12/1969 | Scanlon | ............... | A01K 15/027 601/24 |
| 3,709,197 A | * | 1/1973 | Moseley | ............... | A01K 15/027 119/700 |
| 3,791,348 A | * | 2/1974 | Marnett | ............... | A01K 1/0135 119/482 |
| 4,095,561 A | * | 6/1978 | Ruetenik | .............. | A01K 15/027 119/700 |
| 4,332,217 A | * | 6/1982 | Davis | ..................... | A61D 11/00 119/700 |
| 4,334,695 A | * | 6/1982 | Ashby | ..................... | B62M 1/34 280/228 |
| 4,635,928 A | * | 1/1987 | Ogden | ............... | A63B 22/0257 482/54 |

(Continued)

FOREIGN PATENT DOCUMENTS

CN 203219805 U 10/2013
JP 2006325575 A 12/2016

(Continued)

OTHER PUBLICATIONS

The Henry Ford's Innovation Nation YouTube Video, Lopifit Walking Bike (https://www.youtube.com/watch?v=UQoJJfzdrEs) (Year: 2017).*

(Continued)

*Primary Examiner* — Timothy D Collins
*Assistant Examiner* — Maria E Graber
(74) *Attorney, Agent, or Firm* — Fish IP Law, LLP

(57) ABSTRACT

The inventive subject matter provides a device in which a pet stroller comprises at least three wheels, a battery, a motor, and a treadmill. The treadmill is positioned inside of the stroller and has a belt upon which an animal walk and run. The battery is configured to power the motor, and in at least some contemplated embodiments, movement of one or more of the wheels of the stroller can be used to directly move the belt of the treadmill, and/or indirectly power the belt by providing power to the battery.

8 Claims, 3 Drawing Sheets

(56) References Cited

U.S. PATENT DOCUMENTS

| | | | | |
|---|---|---|---|---|
| 4,796,565 | A * | 1/1989 | Charbeneau | A01K 1/0245 119/727 |
| 6,584,937 | B1 * | 7/2003 | Ludolph | A01K 1/0245 119/500 |
| 6,786,181 | B1 * | 9/2004 | Leanheart | A01K 1/0236 119/474 |
| 6,837,186 | B1 | 1/2005 | Terao | |
| 6,913,271 | B2 * | 7/2005 | Gordon | A01K 1/0236 297/484 |
| 8,161,913 | B1 * | 4/2012 | Barfield | A01K 15/027 119/703 |
| 10,582,698 | B2 | 3/2020 | Rice | |
| 2002/0066416 | A1 * | 6/2002 | Valle | A01K 15/027 119/703 |
| 2008/0047766 | A1 * | 2/2008 | Seymour | B60L 53/80 180/65.1 |
| 2008/0287266 | A1 * | 11/2008 | Smith | A01K 11/001 482/54 |
| 2009/0050400 | A1 | 2/2009 | Segawa | |
| 2010/0326366 | A1 * | 12/2010 | Park | A01K 15/027 119/728 |
| 2012/0252635 | A1 | 10/2012 | Woelfel et al. | |
| 2016/0021843 | A1 * | 1/2016 | Jakubowski | B62B 9/26 119/453 |
| 2016/0374317 | A1 * | 12/2016 | Hayashi | A01K 15/027 119/700 |
| 2018/0132446 | A1 * | 5/2018 | Jakubowski | B62B 7/105 |
| 2019/0002007 | A1 | 1/2019 | Xiang | |
| 2019/0053462 | A1 * | 2/2019 | Lin | A01K 1/0236 |
| 2021/0227791 | A1 * | 7/2021 | De Oliveira Seixas | A01K 15/027 |

FOREIGN PATENT DOCUMENTS

| | | |
|---|---|---|
| KR | 10-2019-0084846 A | 7/2019 |
| TW | M540072 U | 4/2017 |
| WO | 2019209129 A1 | 10/2019 |

OTHER PUBLICATIONS

Lopifit Walking Bike (https://lopifitus.com/about/) (Year: 2022).*
NuVu The Innovation School Dog Treadmill (https://cambridge.nuvustudio.com/studios/open-innovation-spring-2016/teambraceface#ttab-updates.url) (Year: 2016).*
NuVu The Innovation School, website May 2016, 10 pgs.
International Search Report and Written Opinion for International Application No. PCT/US2021/045009 dated Nov. 24, 2021, 11 pages.

* cited by examiner

PET STROLLER WITH MOTOR OPERATED TREADMILL

This application claims benefit of priority to U.S. provisional application 63/062,587, filed Aug. 7, 2020. Provisional application 63/062,587 and all other extrinsic references are incorporated herein by reference in their entirety.

The field of the invention is pet strollers.

BACKGROUND

The following description includes information that may be useful in understanding the present invention. It is not an admission that any of the information provided herein is prior art or relevant to the presently claimed invention, or that any publication specifically or implicitly referenced is prior art.

Sixty-seven percent of U.S. households, or about 85 million families, own a pet, according to the 2019-2020 National Pet Owners Survey conducted by the American Pet Products Association. There were approximately 89.7 million dogs owned in the United States in 2017. This is an increase of over 20 million since the beginning of the survey period in 2000, when around 68 million dogs were owned in the United States.

Many people find it pleasurable to walk with their dog. However, problems sometimes arise depending upon the size and the seniority of the dog or dog walker. Sometimes the dog is too small, tired to keep up with the dog walker, and in other cases the dog is too large or rambunctious for the dog walker to keep up. Such circumstances can negatively impact the walking experiences of the dog or the dog walker.

U.S. Pat. No. 6,913,271 to Gordon addresses some of these problems by providing a pet stroller in which the dog is positioned in a wheeled vehicle or buggy. However, transporting the dog in that manner provided the dog with little to no exercise.

A dog stroller in which a dog is positioned on a movable belt is taught by NuVu in https://cambridge.nuvustudio.com/studios/open-innovation-spring-2016/teambraceface#tab-updates-url. The disclosure contemplates that a motor can be used to push the stroller, while the dog controls the speed of the treadmill by walking at its own pace. As far as the Applicant can tell, the Nuvu device does not include use of a motor to operate the belt of the treadmill.

Each reference mentioned herein is incorporated by reference to the same extent as if each individual publication or patent application were specifically and individually indicated to be incorporated by reference. Where a definition or use of a term in the reference is inconsistent or contrary to the definition of that term provided herein, the definition of that term provided herein applies and the definition of that term in the reference does not apply.

Thus, there is still a need for a pet stroller having a motorized treadmill.

SUMMARY OF THE INVENTION

The inventive subject matter provides a device in which a pet stroller comprises at least three wheels, a battery, a motor, and a treadmill. The treadmill is positioned inside of the stroller and has a belt upon which an animal walk and/or run. The battery is configured to power the motor, and in at least some contemplated embodiments, movement of one or more of the wheels of the stroller can be used to directly move the belt of the treadmill, and/or indirectly power the belt by providing power to the battery.

The speed of the belt is preferably user-adjustable in the range of 0.0-20.0 km/hour.

In some embodiments, the battery is re-chargeable by the group consisting of sunlight, a battery charger, rotation of the wheels (kinetic energy generated by pushing/pulling the stroller by a user), and rotation of the belt (kinetic energy generated by rotation of the belt by autonomous walking/running of an animal). The battery can be user-removable from the pet stroller.

The pet stroller further comprises a brake configured to restrict movement of the wheels when a brake bar is released, a shade roof configured to be openable, a side cover made of a breathable mech fabric, and a harness configured to restrict movement of an animal positioned on the track.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various objects, features, aspects and advantages of the inventive subject matter will become more apparent from the following detailed description of preferred embodiments, along with the accompanying drawing figures, in which like numerals represent like components.

DETAILED DESCRIPTION

Figure 1:
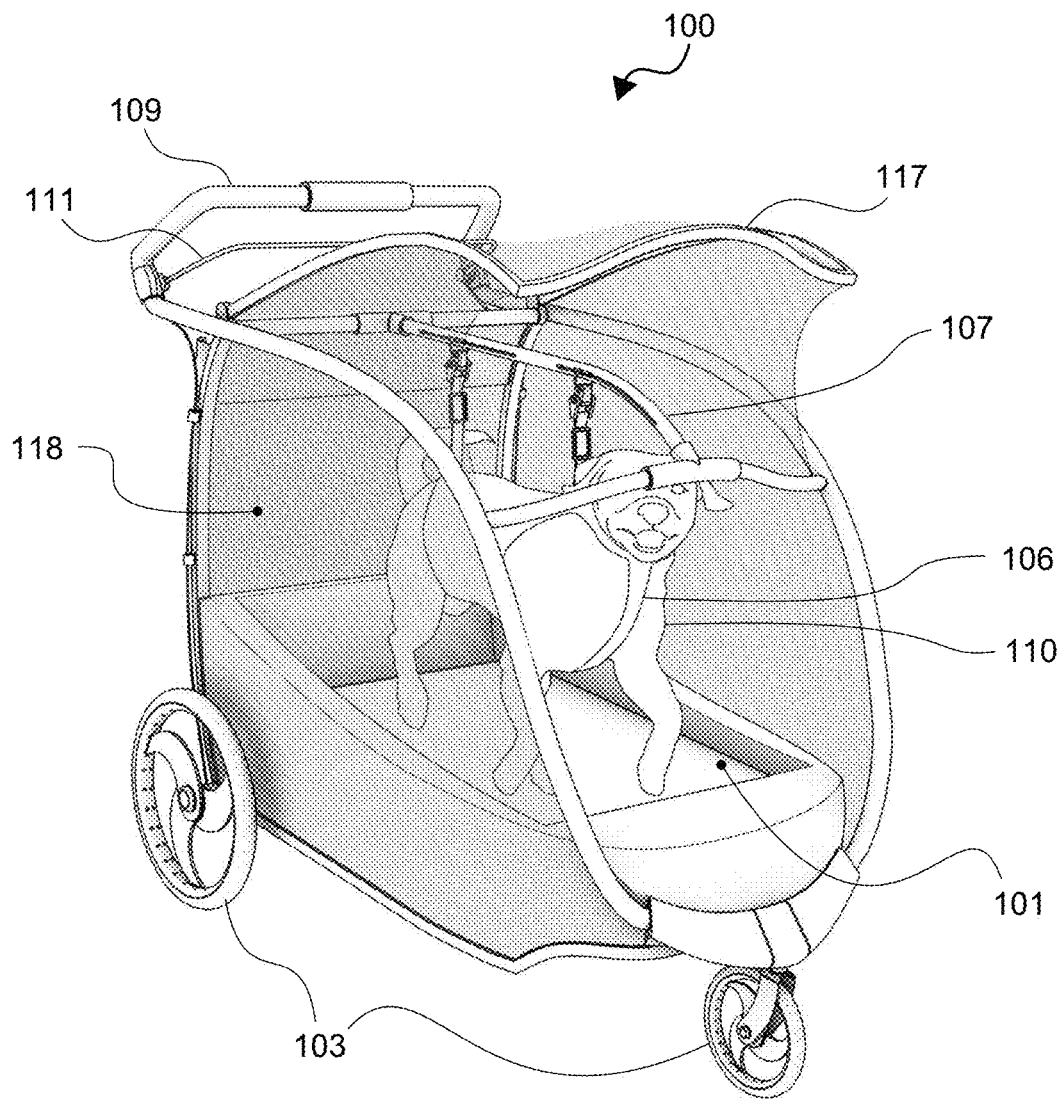
FIG. 1 is a front perspective view of an exemplary pet stroller with treadmill with a pet in position.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

COMPONENTS of the device as shown in FIG. 1-5
100. Pet stroller
101. Treadmill built into stroller.
102. Rechargeable battery within a rechargeable battery compartment.
103. Wheels
104. Motor flywheel/motor
105. Running belt
106. Harness with top front and back attachments
107. Speed sensing attachments for harness: Auto sensing speed control based on location of attachments.
108. Touchscreen controller for treadmill: Adjust speed/enable auto sensor for speed
109. Comfort grip handle with 3 grip positions: Center, top two handed, and side two handed.
110. Animal
111. Brake bar with auto release brake.
112. Back roller
113. Drive belt—motor 104 to back roller 112.
114. Front roller
115. Drive belt—wheel to motor
116. Wheels with power for optional push boost and manual brake lock.
117. Adjustable shade that can open/close.
118. Breathable mesh fabric.
119. Cup holders.
120. Small storage compartment.
121. Belt support FIG. 1-5 generally depict a pet stroller 100 having a treadmill 101, and a rechargeable battery 102 and at least three wheels 103. The treadmill 101 is positioned inside of the stroller 100 and has a belt 105 upon which an animal 110 walk and run. The battery 102 is configured to power the motor 104. In embodiments, the battery 102 is capable of storing electricity converted from the kinetic energy generated by pushing/pulling the stroller 100. In embodiments, the battery 102 can store electricity converted from the kinetic energy generated by the motion of the treadmill 101.

Figure 2:
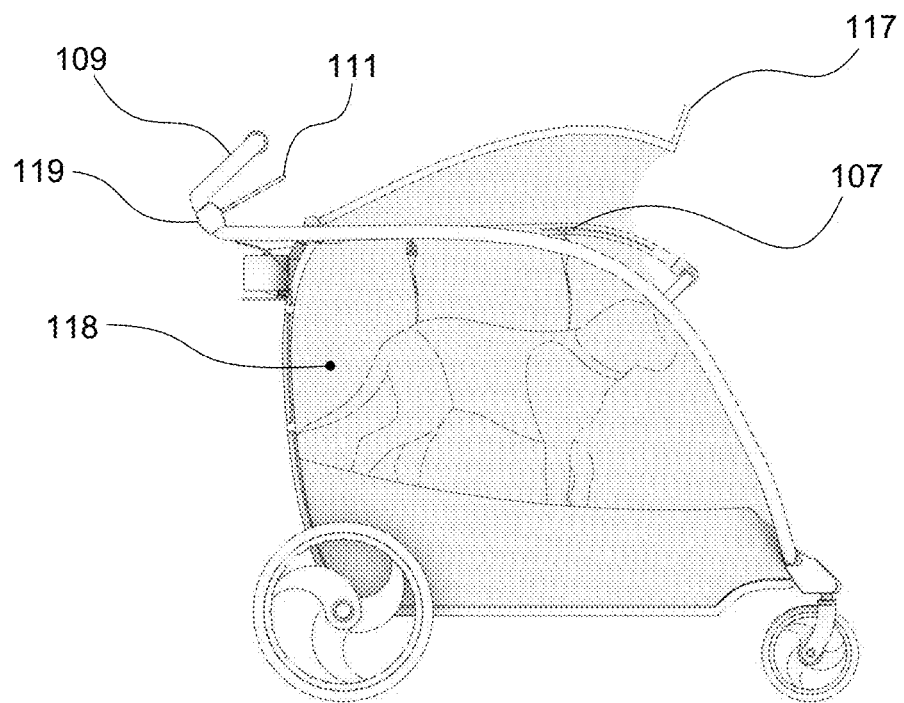
FIG. 2 is a side view of the pet stroller with treadmill with a pet in position.
Figure 3:
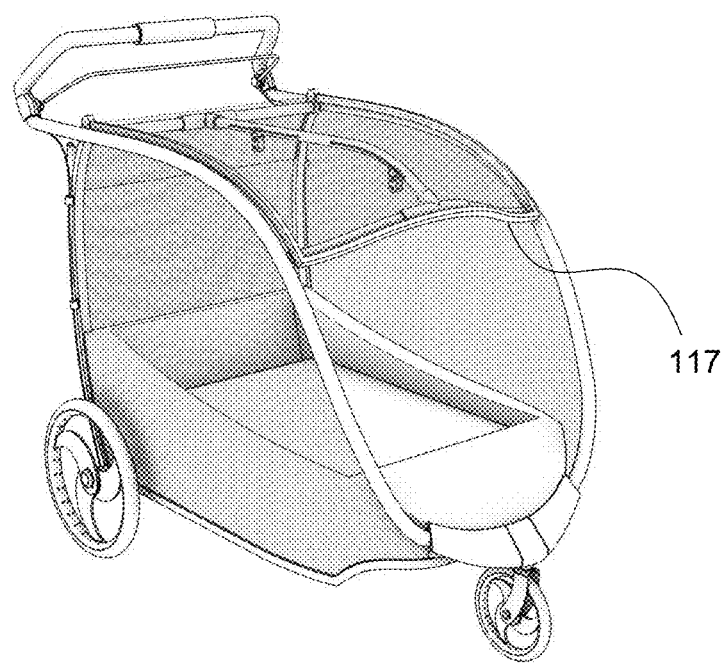
FIG. 3 is a front perspective view of the pet stroller with treadmill with closed shade component.
Figure 4:
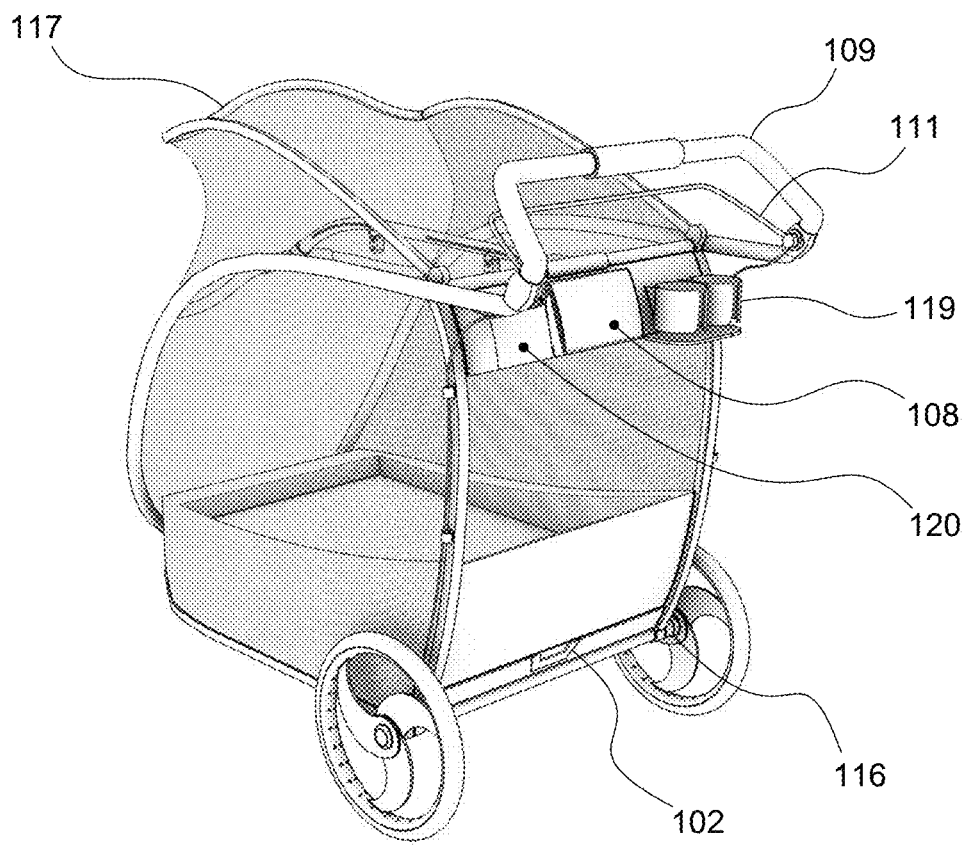
FIG. 4 is a rear perspective view of the pet stroller with treadmill.

FIG. 1 is a perspective view of the stroller 100 with a dog 110 in position to walk or run on belt 105 of treadmill 101. As seen, in FIG. 1, the dog 110 is secured in place by a harness 106. The pet harness 106 keeps the pet 110 on the belt 105, such that the pet 110 is not injured from sliding off of the belt 105 or from fall out of the stroller 100. The harness 106 is made of flexible material and can be elastic to accommodate the pet's postural change such as standing, sitting, or laying down on the belt. FIG. 2 is a side view of the stroller 100 of FIG. 1. FIG. 3 shows the stroller 100 without the pet 110 or the harness 106. FIG. 4 shows a rear perspective view of the stroller 100.

In some embodiments, harness 106 includes attachments at the neck and rump of pet 110 that are coupled with a speed sensing mechanism 107 enables auto sensing speed control for safety of the pet. The speed sensor 107 is a sensor that is capable of detecting a force exerted by the animal 110 (such as a pull in the forward or rearward direction).

Figure 5:
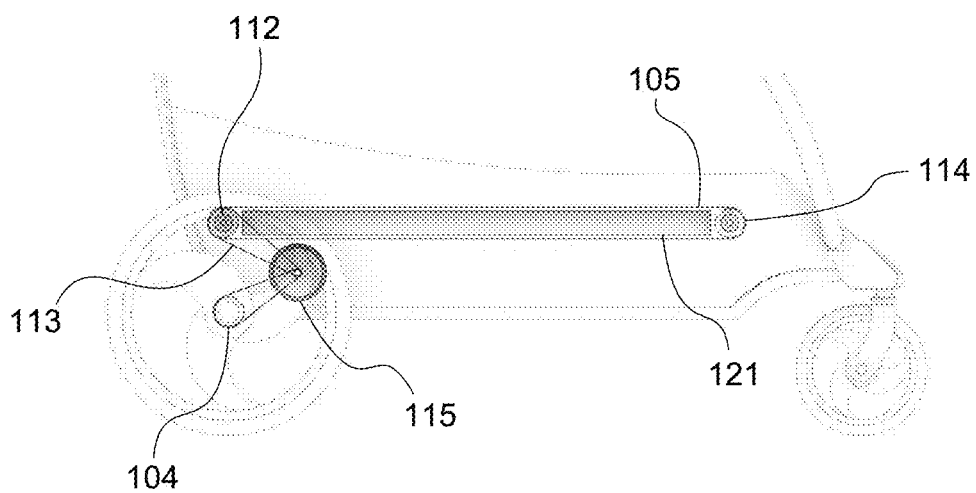
FIG. 5 is an internal view of components related to treadmill.

FIG. 5 shows a close-up view of the drive assembly of the stroller 100, according to embodiments of the inventive subject matter.

The stroller 100 includes a processor that is programmed to control the various functions discussed herein, and as discussed in further detail below.

As seen in the figures, the stroller 100 includes a battery 102. The battery 102 can be a suitable battery from known or hereinafter devised battery technologies, such as lithium-ion, etc. In embodiments, the battery 102 can be removable for charging or replacement.

It is contemplated that the motor 104 driven by power supplied from the battery 102 is configured to mobilize the belt 105 and/or at least one of wheels 103. In preferred embodiment, there is at least a switch having three positions to control the usage of the battery. The first position is no usage of the battery, the second position is the battery used for mobilizing the belt 105 and third one is the battery used for mobilizing the wheels 103, such that the user can choose how to use the battery 102. The processor integrated within the stroller 100 is programmed to detect the selection by the user and control the components of the stroller accordingly.

In embodiments where the belt 105 is driven by the motor 104, the belt 105 is connected to the motor 104 via a drive belt 113 connecting the motor to a back roller 112. The rotation of the motor 104 translates to a rotation of the back roller 112 which in turn drives the belt 105. As seen in FIG. 5, the belt 105 also rolls around a front roller 114

In these embodiments, the speed of the belt 105 can be controlled by a touchscreen 108 installed on the pet stroller.

The speed can be adjusted within a pre-determined range, for example in the range of 0.0-20.0 km/Hour.

In embodiments where one or more of the wheels 103 can be driven by the motor 104, the wheel(s) 103 can be connected to the motor 104 via a drive belt 115.

In case that at least one of wheels 103 is rolled by the motor 104, the speed of the wheel can be controlled by touchscreen 108 installed on the pet stroller 100. The speed can adjusted within a predetermined range, for example in the range of 0.0-20.0 km/Hour.

In embodiments, the processor is programmed to allow propulsion of the wheels 103 by the movement of the belt 105, according to the speed of movement of the animal 110. In this mode, the default can be a one-to-one drive where the speed of the wheels 103 is directly translated to the speed of the belt 105 so the stroller moves as fast as the animal 110 is running.

In these embodiments, the coupling of the belt 105 to the wheels 103 can be of a direct-drive arrangement (via both the drive belt 113 and drive belt 115 coupling to the motor 104) such that the movement of the belt 105 can drive the wheels 103. Likewise, in a direct-drive coupling, moving the stroller 100 by a user such that the wheels 103 turn will then translate to a corresponding motion of the belt 105.

In other modes of operation (which can be selectable by the user), the motor 104 can provide an assist such that the stroller is moved partly by the speed of the belt 105 and partly by the motor 104, so that the actual speed of the stroller 100 is faster than the running or walking speed of the animal 110. In other embodiments, the processor can control the drive of motor 104 on the wheels 103 such that the stroller 100 moves slower than the speed of the belt 105. The excess speed of the belt 105 can be used to charge the battery 102 as described elsewhere herein.

In embodiments, the processor can be programmed to provide an assist when going uphill or downhill. When going uphill, the processor can control the motor 104 to provide power to wheels 103 to provide an assist for the user walking uphill. Likewise, when walking downhill, the processor can control the motor 104 to provide resistance such that the stroller 100 will not roll down the hill faster than the user desires.

In embodiments, the brakes discussed herein can be a regenerative braking system that, when applied, provides power to battery 102.

In embodiments, the battery 102 can be charged with electricity converted from the kinetic energy generated by pushing/pulling the pet stroller by a user. In these embodiments, the stroller 100 includes an alternator or other mechanism that can convert kinetic motion into electricity. For example, the motor 104 may have an included alternator for this purpose. The motion of one or more of the wheels is translated to the motor via drive belt 115. The use of alternators or other mechanisms to generate electricity is known in the art, and are suitable for the purposes discussed herein.

In embodiments, the battery 102 can be charged with electricity converted from the kinetic energy generated by autonomous animal walking/running on the belt 105. The motion of the belt 105 is translated to the motor 104 via the connected back roller 112 and drive belt 113, which is converted to electricity by the aforementioned alternator or other electricity-generating mechanism. Thus, the energy generated by either the user or the animal can be recycled efficiently.

The pet stroller 100 has a handle 109 that can be held by a user, allowing to push/pull the pet stroller 100 and to change the direction of the movement. It is contemplated that a "dead man" type of brake bar 111 near the handle can be used to engage brakes if the bar is released. The handle 109 and the brake 111 are juxtaposed position each other, such that the user can easily grab both the handle and the brake during driving the pet stroller 100.

It is contemplated that, in embodiments, the battery 102 can be charged using a battery charger that can be plugged into the on-board battery 102 via standard connectors (e.g., electrical connectors, USB, etc.).

In embodiments, the stroller 100 is equipped with solar cells that are coupled with the battery 102, such that battery 102 can be charged by using sunlight.

In some embodiments, an additional brake 116 (K) is installed to lock the wheels manually. This brake lock is useful when the pet stroller 100 is used indoors where the animal can exercise using the treadmill with a static pet stroller.

In some embodiments, the pet stroller 100 may have an openable shade 117, and the angle of the opening can be user adjustable such as widely or slightly opened. All lateral, frontal, and back sides can be covered by a breathable mesh fabric material 118 (C). However, at least one of three sides can be openable using fasteners, button opening/closing or other preferred mechanism, or entirely no-coverage on the side to allow the animal 110 to enter and exit the pet stroller.

In some embodiments, the pet stroller has cup holders 119 and a small storage compartment 120.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A pet stroller comprising:
    a stroller including at least three wheels;
    a treadmill positioned inside the stroller, and having a belt upon which an animal can walk or run;
    a battery configured to power a motor that moves the belt;
    a harness configured to restrict the movement of the animal on the treadmill, the harness including attachments at the neck and rump of the animal, the attachments coupled to a speed sensing mechanism;
    the speed sensing mechanism capable of detecting a pull in a forward direction and a pull in a rearward direction to control the speed of the treadmill.

2. The pet stroller of claim 1, wherein the speed of the treadmill is user-adjustable in at least the range of 0.0-20.0 km/hour.

3. The pet stroller of claim 1, wherein the battery is configured to be re-charged by at least one of sunlight, a battery charger, rotation of the wheels, or rotation of the belt.

4. The pet stroller of claim 1, wherein the battery is user-removable from the pet stroller.

5. The pet stroller of claim 1, further comprising a brake configured to restrict movement of the wheels when a brake bar is released.

6. The pet stroller of claim 1, further comprising a shade roof.

7. The pet stroller of claim 1, further comprising a side cover made of a breathable mesh fabric.

8. The pet stroller of claim 1, further comprising a direct drive such that rotation of at least one of the at least three wheels directly moves the treadmill belt.

* * * * *